US 6,681,326 B2

(12) United States Patent
Son et al.

(10) Patent No.: US 6,681,326 B2
(45) Date of Patent: *Jan. 20, 2004

(54) SECURE DISTRIBUTION OF VIDEO ON-DEMAND

(75) Inventors: Yong Ho Son, Palo Alto, CA (US); Christopher Goode, Menlo Park, CA (US)

(73) Assignee: DIVA Systems Corporation, Redwood City, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 09/850,231

(22) Filed: May 7, 2001

(65) Prior Publication Data

US 2001/0017920 A1 Aug. 30, 2001

Related U.S. Application Data

(63) Continuation of application No. 09/267,800, filed on Mar. 12, 1999, now Pat. No. 6,229,895.

(51) Int. Cl.⁷ .............................. H04L 9/00; H04N 7/167
(52) U.S. Cl. ......................... 713/150; 380/200; 725/31
(58) Field of Search ................................. 713/150, 153, 713/200; 380/200, 210, 211, 212, 239, 217; 725/31, 25; 705/51, 52

(56) References Cited

U.S. PATENT DOCUMENTS

| | | | | |
|---|---|---|---|---|
| 5,504,816 A | * | 4/1996 | Hamilton et al. | 380/217 |
| 5,838,792 A | * | 11/1998 | Ganesan | 380/282 |
| 6,055,314 A | * | 4/2000 | Spies et al. | 380/228 |
| 6,424,717 B1 | * | 7/2002 | Pinder et al. | 380/239 |

* cited by examiner

Primary Examiner—Matthew Smithers
(74) Attorney, Agent, or Firm—Moser, Patterson & Sheridan, LLP

(57) ABSTRACT

In accordance with a first aspect, a remote server receives video programming in a first encrypted form and stores the video programming. After the remote server receives a request from a subscriber station for transmission of the video programming, the remote server decrypts the video programming, re-encrypts the video programming into a second encrypted form, and then transmits the video programming to the subscriber station. In accordance with a second aspect, a remote server receives video programming in a first encrypted form, decrypts the video programming, re-encrypts the video programming into a second encrypted form, and then stores the video programming. After the remote server receives a request from a subscriber station, the remote server simply transmits the video programming. In accordance with a third aspect, a remote server receives video programming in a first encrypted form and stores the video programming. After the remote server receives a request from a subscriber station, the remote server passes through the video content by transmitting the video programming. In accordance with a fourth aspect, a remote server receives pre-encrypted video programming and stores it. After the remote server receives a request from a subscriber station, the remote server completes encryption of the video programming and then transmits the video programming.

19 Claims, 8 Drawing Sheets

SECURE DISTRIBUTION OF VIDEO ON-DEMAND

CROSS REFERENCE TO RELATED APPLICATIONS

This application is a continuation of commonly assigned U.S. Ser. No. 09/267,800, filed on Mar. 12, 1999, now U.S. Pat. No. 6,229,895.

BACKGROUND OF THE INVENTION

1. Field of the Invention

This invention relates generally to the field of video distribution networks. In particular, this invention relates to secure video distribution networks.

2. Description of the Background Art

Security is an important issue for video distribution networks. For cable distribution networks, there are various portions or locations where security is of concern.

A first portion where security is of concern is the primary distribution network. The primary distribution network is where video content is transferred from television studios to distribution centers. A second portion where security is of concern is the secondary distribution network. The secondary distribution network is where the video content is transmitted from a distribution center to subscriber stations.

For video on-demand distribution networks, there is an additional point where security is of concern. That point is a remote server within a distribution center. Typically, such a remote server stores the video content before the video content is distributed to the subscriber stations.

SUMMARY OF THE INVENTION

The present invention provides a solution to the security issues presented above, especially with regards to security at a remote server. In accordance with a first aspect of the invention, a remote server receives video programming in a first encrypted form and stores the video programming in the first encrypted form. After the remote server receives a request from a subscriber station for transmission of the video programming, the remote server decrypts the video programming, re-encrypts the video programming into a second encrypted form, and then transmits the video programming in the second encrypted form to the subscriber station.

In accordance with a second aspect of the invention, a remote server receives video programming in a first encrypted form, decrypts the video programming, re-encrypts the video programming into a second encrypted form, and then stores the video programming in the second encrypted form. After the remote server receives a request from a subscriber station for transmission of the video programming, the remote server simply transmits the video programming in the second encrypted form to the subscriber station.

In accordance with a third aspect of the invention, a remote server receives video programming in a first encrypted form and stores the video programming in the first encrypted form. After the remote server receives a request from a subscriber station for transmission of the video programming, the remote server passes through the video content by transmitting the video programming in the first encrypted form to the subscriber station.

In accordance with a fourth aspect of the invention, a remote server receives pre-encrypted video programming and stores the pre-encrypted video programming. After the remote server receives a request from a subscriber station for transmission of the video programming, the remote server completes encryption of the video programming and then transmits the video programming to the subscriber station. At the subscriber station, the video programming is fully decrypted.

DETAILED DESCRIPTION OF THE PREFERRED EMBODIMENTS

Figure 1:
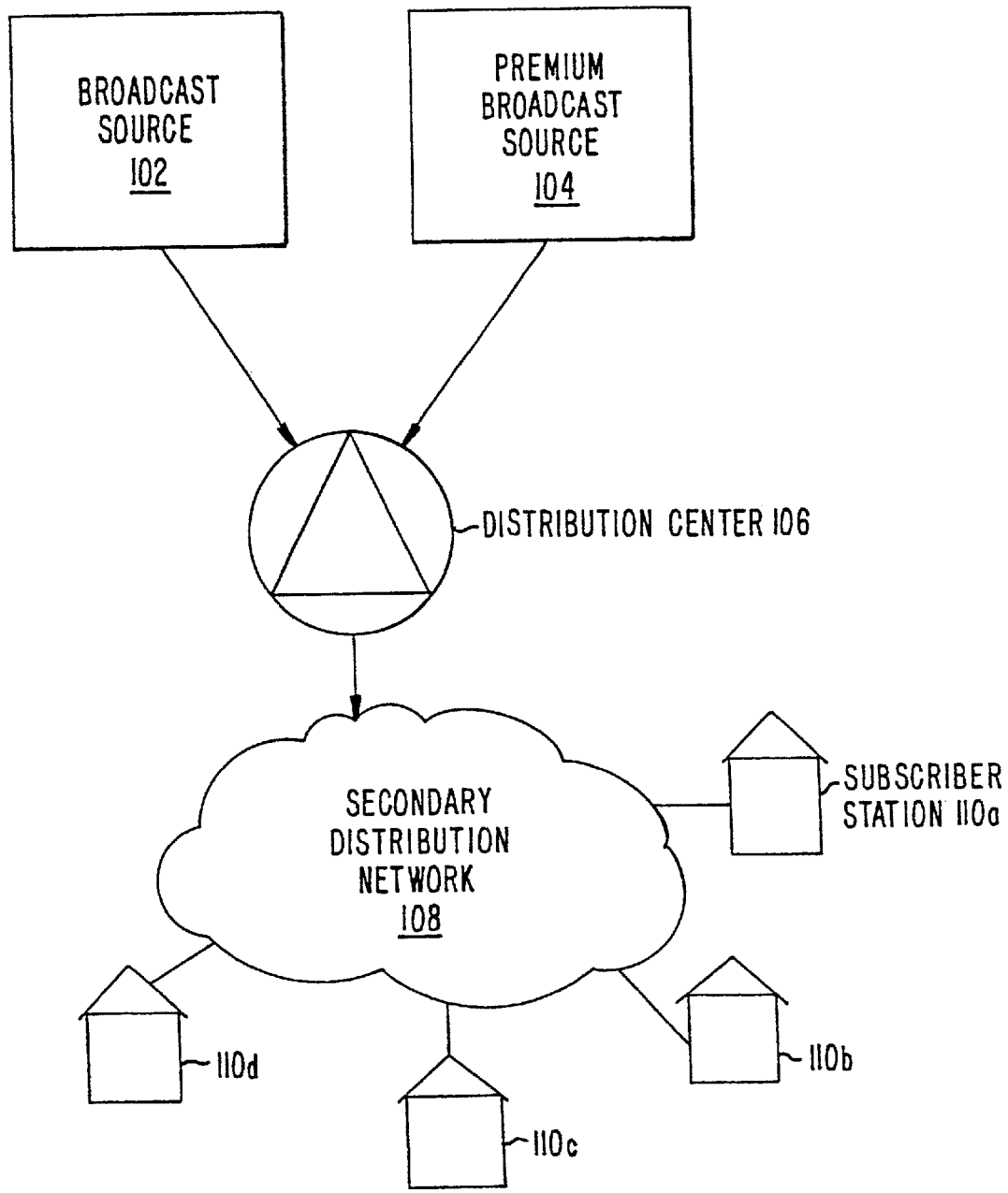
FIG. 1 is a schematic diagram of a conventional cable distribution network.

FIG. 1 is a schematic diagram of a conventional cable distribution network. The conventional cable distribution network typically includes one or more broadcast sources 102, one or more premium broadcast sources 104, one or more distribution centers 106, one or more secondary distribution networks 108, and a plurality of subscriber stations 110.

The broadcast source 102 may be, for example, a local television station. For instance, an affiliate station of a major network such as ABC, NBC, CBS, FOX, or UPN. The premium broadcast source 104 may be, for example, a premium channel such as HBO, Showtime, Cinemax, and so on. The sources 102 and 104 may be coupled via a primary distribution network to the distribution center 106. The distribution center 106 may be, for example, a cable head-end. The distribution center 106 may be coupled via a secondary distribution network 108 to the subscriber stations 110. The secondary distribution network 108 comprises may include, for example, various amplifiers, bridges, taps, and drop cables. Finally, the subscriber stations 110 may be, for example, set-top boxes and associated television equipment for viewing the video content by end users.

Figure 2:
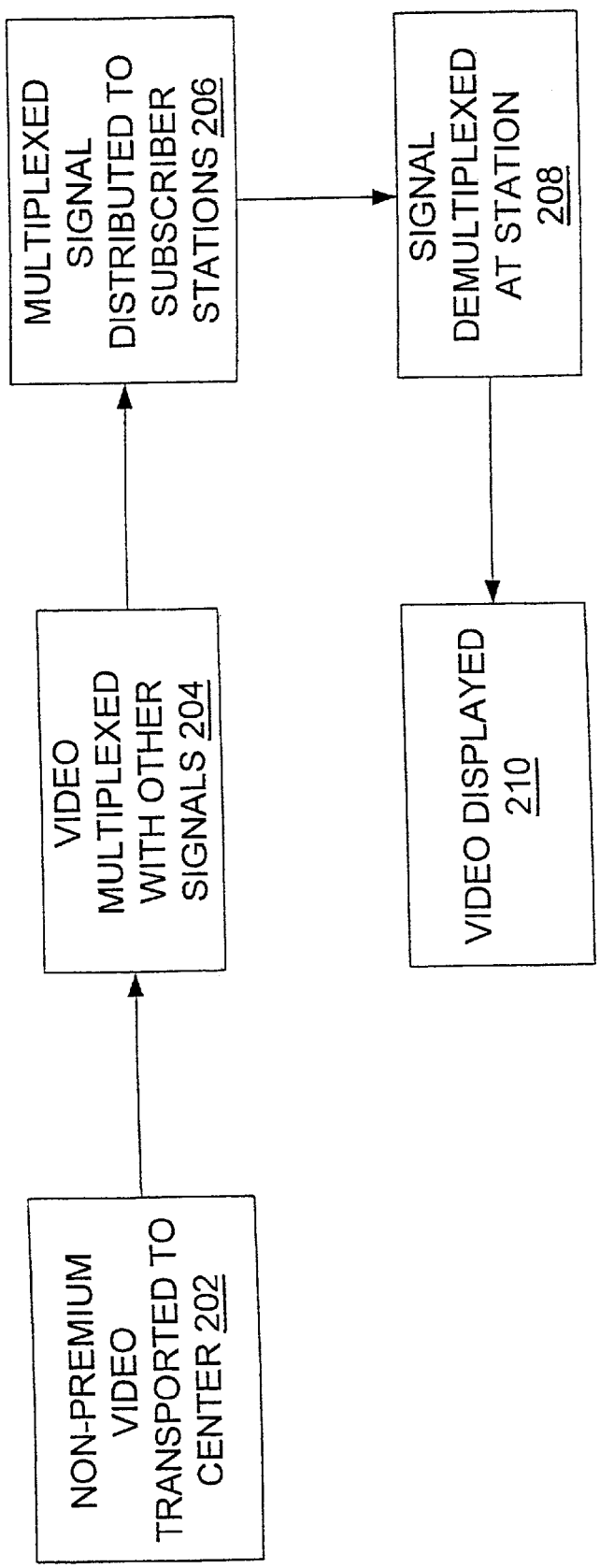
FIG. 2 is a flow chart depicting a conventional insecure process for distributing video content via a conventional cable distribution network.

FIG. 2 is a flow chart depicting a conventional insecure process for distributing video content via a conventional cable distribution network. First, a non-premium video signal is transported 202 from the broadcast source 102 to the distribution center 106. At the distribution center 106, the video signal is multiplexed 204 with other signals to generate a multiplexed signal. The multiplexed signal is then distributed 206 from the distribution center 106 via the secondary distribution network 108 to the subscriber stations 110. At the subscriber stations 110, the multiplexed signal is demultiplexed 208 to isolate the video signal, and then the video signal is displayed 210, typically, on a television monitor.

Figure 3:
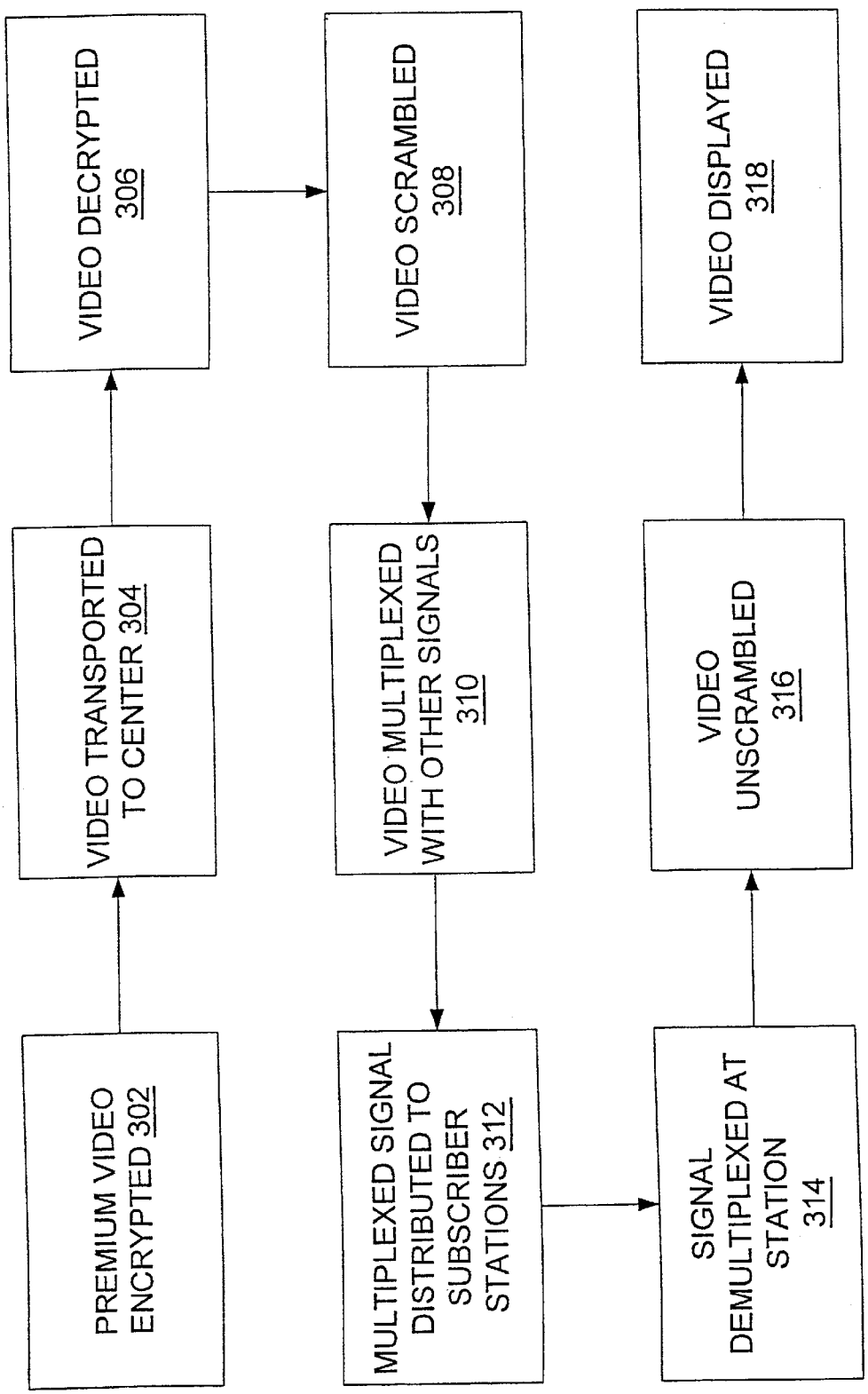
FIG. 3 is a flow chart depicting a conventional (somewhat) secure process for distributing video content via a conventional cable distribution network.

FIG. 3 is a flow chart depicting a conventional (somewhat) secure process for distributing video content via a conventional cable distribution network. First, a premium video signal is encrypted 302 to generate an encrypted signal. The encrypted signal is transported 304 from the premium broadcast source 104 to the distribution center 106.

At the distribution center 106, the video signal is decrypted 306 to regenerate the premium video signal. The premium video signal is then scrambled 308 and multiplexed 310 with other signals to generate a multiplexed signal. The multiplexed signal is then distributed 312 from the distribution center 106 via the secondary distribution network 108 to the subscriber stations 110.

At the subscriber stations 110, the multiplexed signal is demultiplexed 314 to isolate the scrambled video signal, the scrambled video signal is unscrambled 316, and then the video signal is displayed 318, typically, on a television monitor connected to a set-top box. The process in FIG. 3 is a typical conventional process for delivering premium video using scrambling. Other conventional processes also exist.

Figure 4:
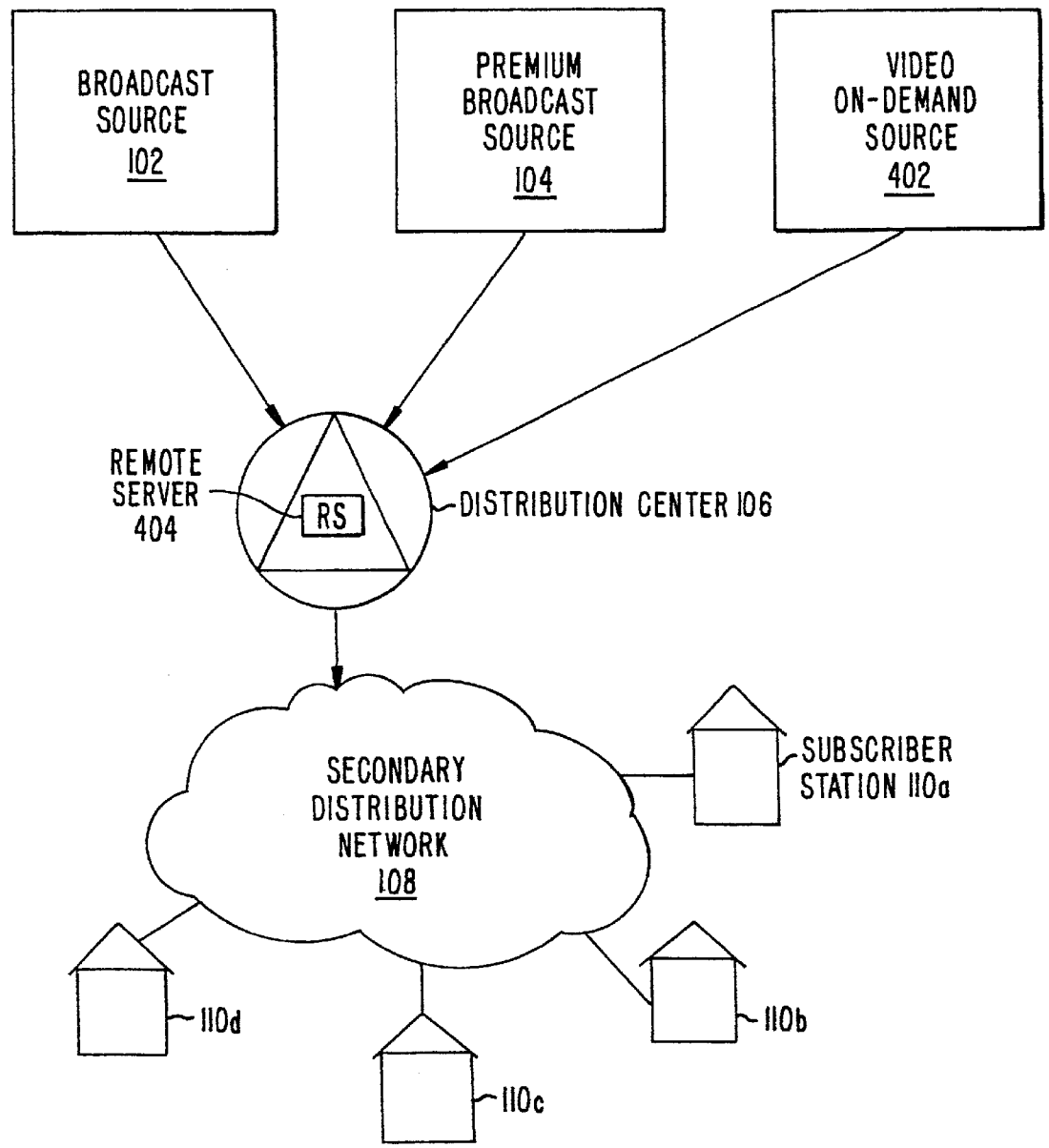
FIG. 4 is a schematic diagram of a cable distribution network including a video on-demand source in accordance with a preferred embodiment of the present invention.

FIG. 4 is a schematic diagram of a cable distribution network including a video on-demand source in accordance with a preferred embodiment of the present invention. In addition to the components of the conventional cable distribution network shown in FIG. 1, the cable distribution network shown in FIG. 4 includes a video on-demand source 402 and a remote server 404. The video on-demand source 402 may house, for example, a collection of video programs such as, for example, movies. As shown in FIG. 4, the remote server 404 may be located within the distribution center 106. The remote server 404 may include, for example, a parallel processing computer configured to be a video server, a disk drive array to store video data, and a video session manager to provide session control of the video data flowing to and from the video server.

Figure 5A:
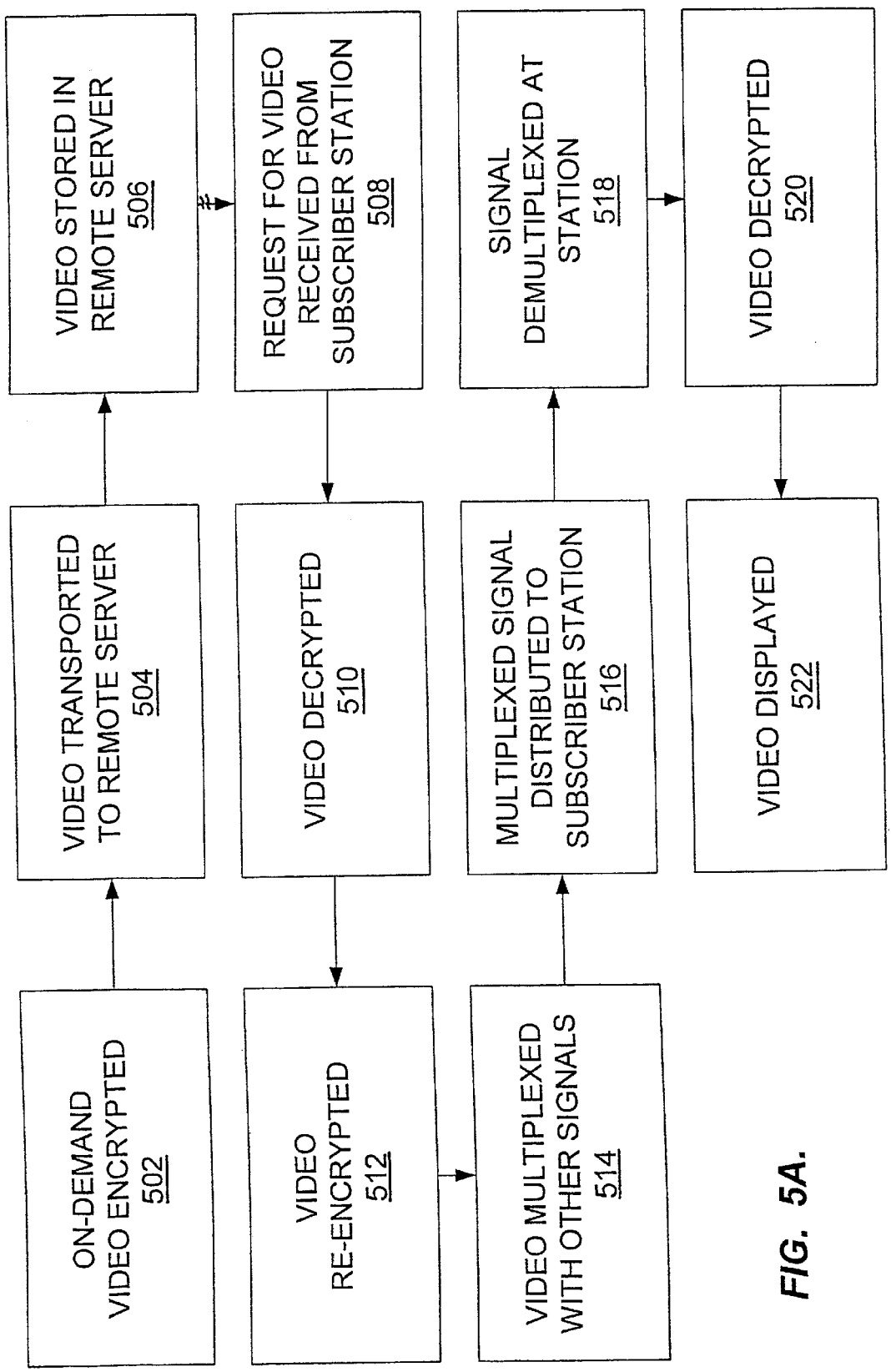
FIG. 5A is a flow chart depicting a secure process for distributing video on-demand content via a cable distribution network in accordance with a first aspect of the present invention.

FIG. 5A is a flow chart depicting a secure process for distributing video on-demand content via a cable distribution network in accordance with a first aspect of the present invention. The process depicted in FIG. 5A may be called a store, decrypt, and re-encrypt process.

First, a video program is encrypted 502 by a video on-demand source 402 to generate an encrypted program in a first encrypted form. The encrypted program is transported 504 via a primary distribution network from the video on-demand source 402 to a remote server 404 within a distribution center 106. The encrypted program is then stored 506 in the remote server 404.

Subsequently, when the remote server 404 receives 508 a request for transmission of the video program from a subscriber station 110, the remote server 404 responds by first decrypting 510 the video program from the first encrypted form. A first key is may be used to accomplish such decryption 510, and such key may have been received from the video on-demand source 402 via a communication channel that is separate from the one used to transmit the video program. After the video program is decrypted 510, the remote server 404 re-encrypts 512 the video program into a second encrypted form using a second key.

The second key may be a public key of a public key encryption system. Such a public key encryption system uses two different key: a public key to encrypt data and a private key to decrypt data. In that case, decryption would be accomplished using a corresponding private key of the public key encryption system. Examples of such a public key encryption system is encryption under the PGP (Pretty Good Privacy) system or under the RSA (Rivest, Shamir, and Adleman) system. Alternatively, the second key may be a private key of a private key encryption system. Such a private key encryption system uses a single private key to encrypt and decrypt data. Examples of such a private key encryption system is encryption under the Data Encryption Standard (DES) or under triple-DES which involves applying DES three times to enhance security. The private key(s) itself may be transmitted from the remote server 404 to the subscriber station 110 while encrypted in a third encrypted form.

After the video program is re-encrypted 512, the re-encrypted program in the second encrypted form (and the second key if necessary) is multiplexed 514 with other signals to generate a multiplexed signal. The multiplexed signal is then distributed 516 via the secondary distribution network 108 to the subscriber stations 110.

At the subscriber stations 110, the multiplexed signal is demultiplexed 518 to isolate the re-encrypted program in the second encrypted form (and the second key if necessary), the re-encrypted program is decrypted 520 from the second encrypted form to generate the unencrypted video program, and then the video program is displayed 522, typically, on a television monitor connected to set-top box.

Figure 5B:
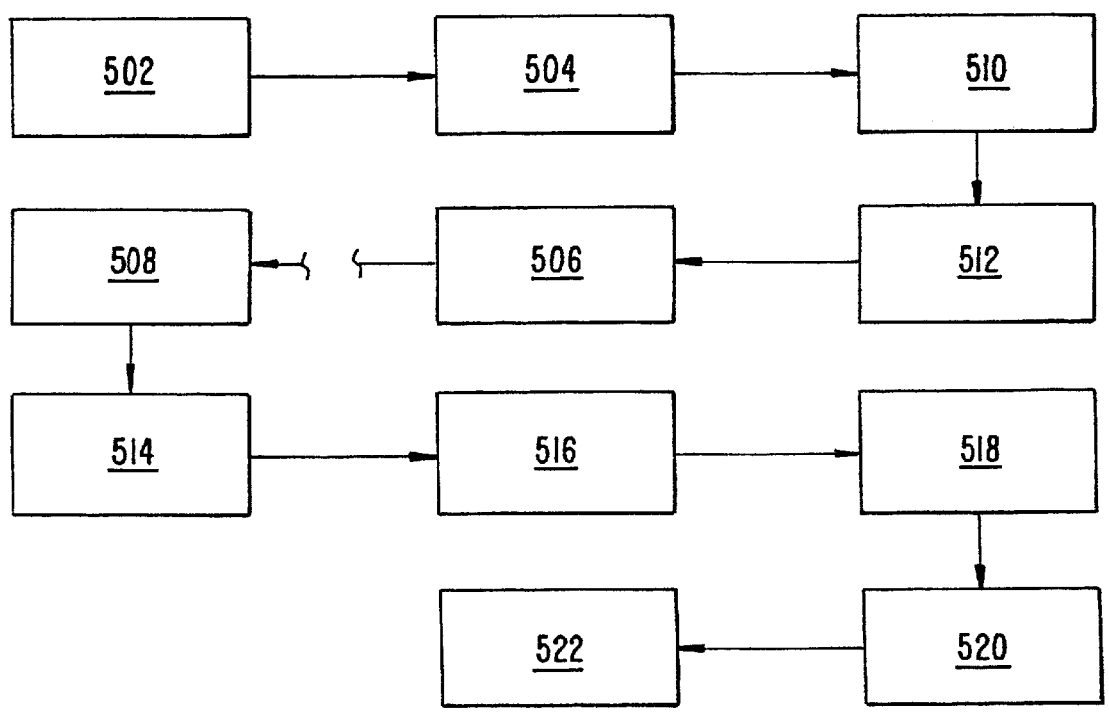
FIG. 5B is a flow chart depicting a secure process for distributing video on-demand content via a cable distribution network in accordance with a second aspect of the present invention.

FIG. 5B is a flow chart depicting a secure process for distributing video on-demand content via a cable distribution network in accordance with a second aspect of the present invention. The process depicted in FIG. 5B may be called a decrypt, re-encrypt, and store process. In comparison with the process in FIG. 5A, the process in FIG. 5B decrypts 510 and re-encrypts 512 the video program before the video program is stored 506 in the remote server 404.

First, a video program is encrypted 502 by a video on-demand source 402 to generate an encrypted program in a first encrypted form. The encrypted program is transported 504 via a primary distribution network from the video on-demand source 402 to a remote server 404 within a distribution center 106. At this point, the remote server 510 decrypts 510 the video program from the first encrypted form. A first key is may be used to accomplish such decryption 510, and such key may have been received from the video on-demand source 402 via a communication channel that is separate from the one used to transmit the video program. After the video program is decrypted 510, the remote server 404 re-encrypts 512 the video program into a second encrypted form using a second key. After the decryption 510 and re-encryption 512, the re-encrypted program is then stored 506 in the remote server 404.

Note that step 506 in FIG. 5B differs from step 506 in FIG. 5A in that step 506 in FIG. 5B involves storing the video program in the second encrypted form while step 506 in FIG. 5A involves storing the video program in the first encrypted form.

Subsequently, when the remote server 404 receives 508 a request for transmission of the video program from a subscriber station 110, the remote server 404 responds by multiplexing 514 the re-encrypted program in the second encrypted form (and the second key if necessary) with other signals to generate a multiplexed signal. The multiplexed signal is then distributed 516 via the secondary distribution network 108 to the requesting subscriber station 110.

At the subscriber stations 110, the multiplexed signal is demultiplexed 518 to isolate the re-encrypted program in the second encrypted form (and the second key if necessary), the re-encrypted program is decrypted 520 from the second encrypted form to generate the unencrypted video program, and then the video program is displayed 522, typically, on a television monitor connected to set-top box.

Figure 6:
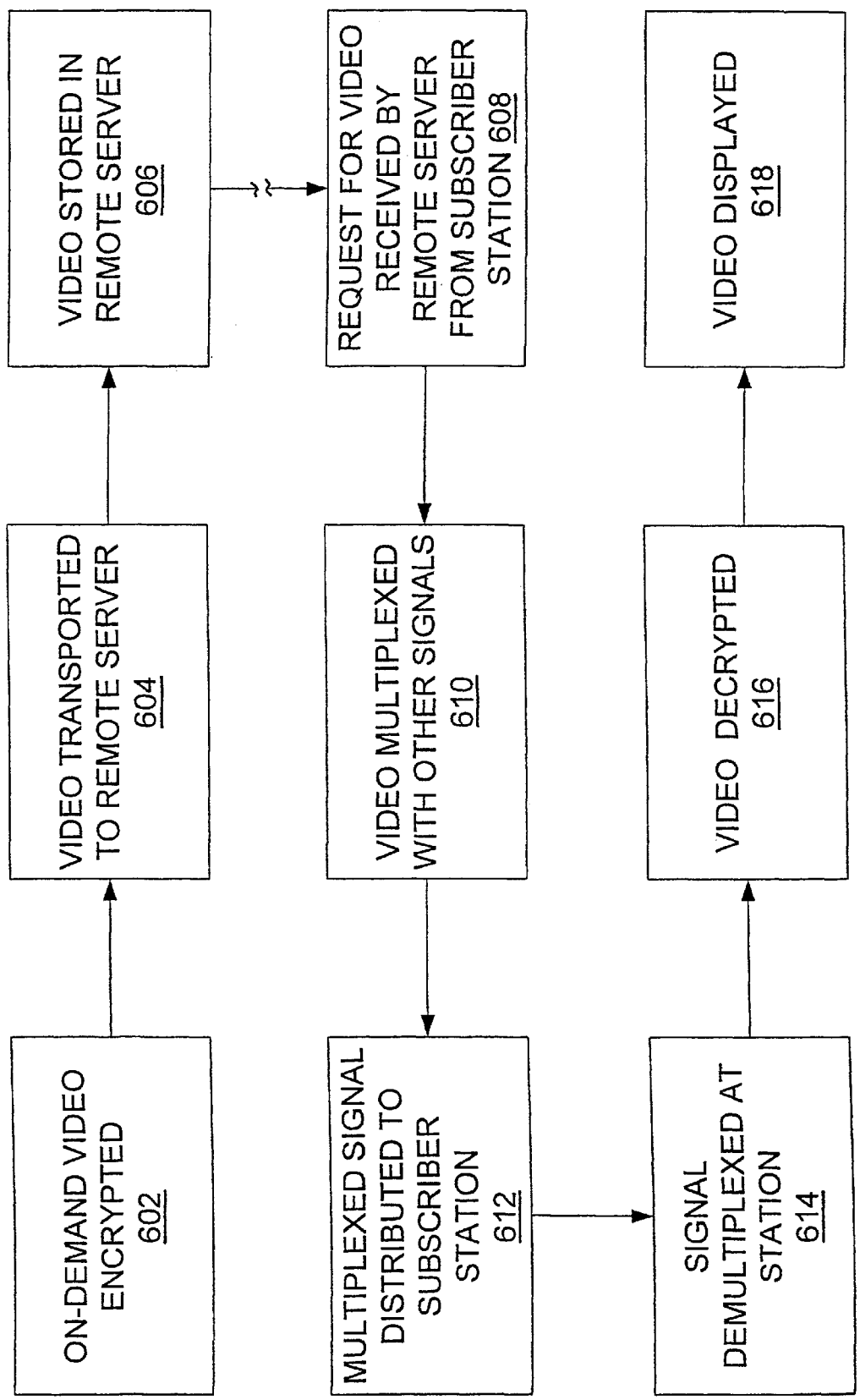
FIG. 6 is a flow chart depicting a secure process for distributing video on-demand content via a cable distribution network in accordance with a third aspect of the present invention.

FIG. 6 is a flow chart depicting a secure process for distributing video on-demand content via a cable distribution network in accordance with a third aspect of the present invention. The process depicted in FIG. 6 may be called a pass-through process.

First, a video program is encrypted 602 by a video on-demand source 402 to generate an encrypted program in a first encrypted form. The encrypted program is transported 604 via a primary distribution network from the video on-demand source 402 to a remote server 404 within a distribution center 106. A key to decrypt the encrypted program may also be transported from the source 402 to the server 404. The encrypted program is then stored 606 in the remote server 404.

The key may be a public key of a public key encryption system. Such a public key encryption system uses two different key: a public key to encrypt data and a private key to decrypt data. In that case, decryption would be accomplished using a corresponding private key of the public key encryption system. Examples of such a public key encryption system is encryption under the PGP (Pretty Good Privacy) system or under the RSA (Rivest, Shamir, and Adleman) system. Alternatively, the key may be a private key of a private key encryption system. Such a private key encryption system uses a single private key to encrypt and decrypt data. Examples of such a private key encryption system is encryption under the Data Encryption Standard (DES) or under triple-DES which involves applying DES three times to enhance security. The private key(s) itself may be transmitted from the source 402 to the server 404 while encrypted in a second encrypted form. Alternatively, the private key(s) may be transported from the source 402 to the server 404 via a communication channel which is separate from the communication channel used to transport the video program from the source 402 to the server 404.

Subsequently, when the remote server 404 receives 608 a request for transmission of the video program from a subscriber station 110, the remote server 404 responds by multiplexing 610 the encrypted program in the first encrypted form (and the key if necessary) with other signals to generate a multiplexed signal. The multiplexed signal is then distributed 612 via the secondary distribution network 108 to the requesting subscriber station 110.

At the subscriber stations 110, the multiplexed signal is demultiplexed 614 to isolate the encrypted program in the first encrypted form (and the key if necessary), the encrypted program is decrypted 616 from the first encrypted form to generate the unencrypted video program, and then the video program is displayed 618, typically, on a television monitor connected to set-top box.

Figure 7:
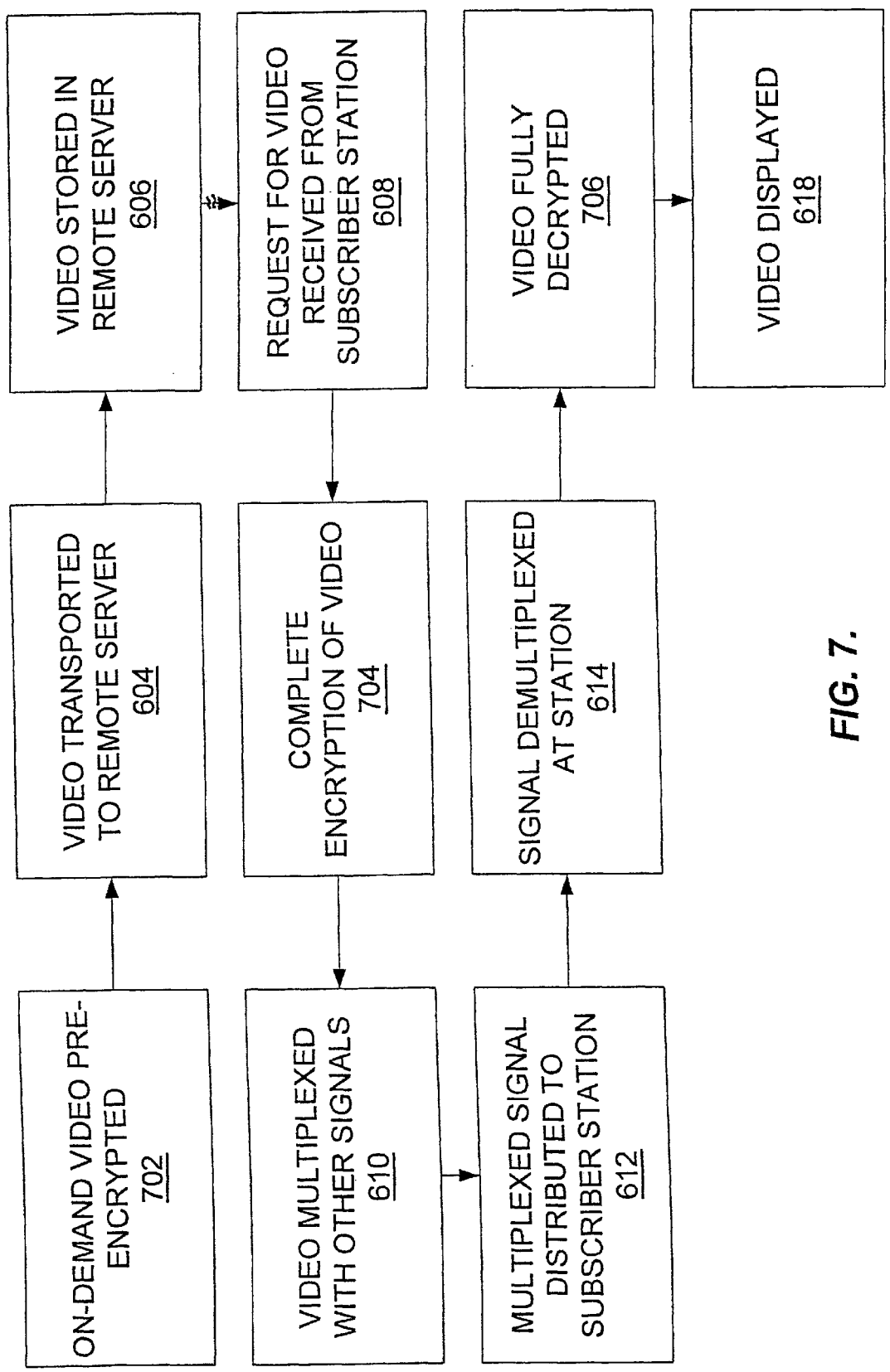
FIG. 7 is a flow chart depicting a secure process for distributing video on-demand content via a cable distribution network in accordance with a fourth aspect of the present invention.

FIG. 7 is a flow chart depicting a secure process for distributing video on-demand content via a cable distribution network in accordance with a fourth aspect of the present invention. The process depicted in FIG. 7 may be called a multiple-layer encryption process. In comparison with the process in FIG. 6, the process in FIG. 7 pre-encrypts 702 the video program at the source 402, completes encryption 704 of the video program at the remote server 404, and fully decrypts 706 the video program at the subscriber station 110.

The pre-encryption step 702 may be implemented by applying a single DES encryption or a double DES encryption. If the pre-encryption step 702 uses a single DES encryption, then the completion of encryption step 704 may be implemented by applying a double DES encryption to achieve triple-DES encryption. Similarly, if the pre-encryption step 702 uses a double DES encryption, then the completion of encryption step 704 may be implemented by applying a single DES encryption to achieve triple-DES encryption. In either case, the video program is transported from the remote server 404 to the subscriber station 110 while under triple-DES encryption. As long as the subscriber station has the three keys required, it will be able to fully decrypt 706 the triple-DES encryption to obtain the unencrypted video program.

It is to be understood that the specific mechanisms and techniques which have been described are merely illustrative of one application of the principles of the invention. For example, while the present invention is described in application to video on-demand, it also has some application in broadcast video. Numerous additional modifications may be made to the methods and apparatus described without departing from the true spirit of the invention.

What is claimed is:

1. A method, comprising:

storing at least one partially encrypted video program received from a programming source;

processing a partially encrypted video program corresponding to a subscriber requested video program to produce a fully encrypted video program; and causing transmission of the fully encrypted video program to the requesting subscriber.

2. The method of claim 1, further comprising:

causing the transmission of a decryption key to said requesting subscriber, said decryption key being necessary to decrypt said fully encrypted video program.

3. The method of claim 1, wherein said fully encrypted video program is encrypted according to a public key associated with said requesting subscriber, said public key having associated with it a private key necessary to decrypt said fully encrypted video program.

4. The method of claim 1, wherein said fully encrypted video program is encrypted according to a private key associated with said requesting subscriber, said private key having associated with it a public key necessary to decrypt said fully encrypted video program.

5. The method of claim 1, wherein said fully encrypted video program is encrypted according to a public key, said public key having associated with it a private key necessary to decrypt said fully encrypted video program, said method further comprising:

causing the transmission of said private key to said requesting subscriber.

6. The method of claim 5, wherein said public key is encrypted prior to transmission to said requesting subscriber.

7. The method of claim 2, wherein said fully encrypted video program is transmitted to said requesting subscriber via a first communications channel and said decryption key is transmitted to said requesting subscriber via a second communications channel.

8. The method of claim 1, wherein said fully encrypted video program is encrypted according to a Data Encryption Standard.

9. The method of claim 1, further comprising:

multiplexing said fully encrypted video program and other signals to create a multiplexed signal for transmission to said requesting subscriber.

10. A method comprising:

storing a video program encrypted in a first form;

decrypting said program from said stored first form encrypting said program into a second form; and transmitting said second form to a subscriber.

11. The method of claim 10, wherein a first key is used to decrypt said first form of said program.

12. The method of claim 11, wherein said first key is transmitted on a communication channel different than a channel used to transmit said first form to said storing means.

13. The method of claim 10, wherein a second key is used to encrypt said program into said second form.

14. The method of claim 13, wherein said second key is a public key of a public key encryption system.

15. The method of claim 13, wherein said second key is a private key encryption system that encrypts and decrypts said second form.

16. The method of claim 15, wherein said private key encryption system utilizes a data encryption standard.

17. The method of claim 16, wherein said second key is transmitted from a remote server to said subscriber while encrypted in a third form.

18. The method of claim 17, wherein said subscriber isolates and de-encrypts said program.

19. A computer readable medium including software instructions that, when executed by a processor, perform a method, comprising:

means for storing a video program encrypted in a first form;

means for decrypting said program from said stored first form;

means for encrypting said program into a second form; and means for transmitting said second form to a subscriber.

* * * * *